United States Patent Office 2,955,039
Patented Oct. 4, 1960

2,955,039
MARGARINE AND METHOD FOR PRODUCING SAME

Daniel Melnick, Teaneck, and Frederick H. Luckmann, Westfield, N.J., assignors to Corn Products Company, a corporation of Delaware
No Drawing. Filed Feb. 20, 1959, Ser. No. 794,501
16 Claims. (Cl. 99—122)

This invention relates to a novel margarine of a high essential fatty acid content and, more particularly, to a highly nutritious margarine having a high ratio of essential fatty acid to saturated fatty acid content.

Conventional margarines made with hydrogenated fats have been subject to frequent criticism in both the scientific and lay press, on account of the marked decrease in essential fatty acid content resulting from hydrogenation of the oil. The essential fatty acids found in limpid vegetable oils are important nutrients. The term "essential" means that these fatty acids, linoleic and linolenic acid, cannot be produced within the human body but must be furnished in the diet. While the active metabolic form of the essential fatty acids in the human body is arachidonic acid, linoleic and linolenic acid are converted to arachidonic acid in vivo, the transformation being expedited by vitamin $B_6$. Thus, any one of the three fatty acids mentioned can serve as a source of the essential fatty acids. From the practical standpoint, however, the only abundant and dependable dietary source is linoleic acid, found in rich supply in the liquid unhydrogenated domestic vegetable oils. This is illustrated by the data in Table I. The essential fatty acids have been shown to be required as dietary components in every animal study. Not only are they required for proper growth, reproduction, lactation and longevity and for normal tissue structure, but also for control of normal plasma and liver cholesterol levels and for normal liver lipid levels.

TABLE I

*Typical fatty acid compositions of natural oils and fats*

| Oil or Fat | Source | Fatty Acids [1] | | Ratio of Linoleic to Saturated |
|---|---|---|---|---|
| | | Linoleic, percent [2] | Saturated, percent | |
| Peanut | Domestic—Vegetable | 25.0 | 17.0 | 1.5 |
| Sesame | do | 42.0 | 11.5 | 3.7 |
| Cottonseed | do | 50.0 | 22.9 | 2.2 |
| Corn: | | | | |
| (a) | do | 49.6 | 10.6 | 4.7 |
| (b) | do | 54.8 | 9.6 | 5.7 |
| Sunflower | do | 59.0 | 7.6 | 7.8 |
| Soybean | do | 58.8 | 12.5 | 4.7 |
| Safflower | do | 76.5 | 10.4 | 7.3 |
| Coconut | Foreign—Vegetable | 2.0 | 88.6 | 0.02 |
| Olive | do | 7.0 | 11.0 | 0.6 |
| Tallow (Beef) | Animal | 3.2 | 45.6 | 0.07 |
| Butter | do | 3.5 | 55.0 | 0.06 |
| Lard | do | 8.0 | 42.1 | 0.2 |

[1] In the triglycerides, according to the spectrophotometric method (Official and Tentative Methods of the American Oil Chemists' Society, Polyunsaturated acids, Cd 7-48, revised May, 1953) following alkali isomerization to convert the polyunsaturated fatty acids to their light-absorbing conjugated forms. This same analytical method was employed throughout the present study. The remaining fatty acids in the triglycerides are almost entirely oleic acid.
[2] Included in these values are 9% linolenic acid in the case of the soybean oil, 1% in the case of the butter oil, and 1% in the case of the lard. In addition, trace quantities of arachidonic acid are found in the latter animal fats.

It will also be noted from the data in Table I, that the liquid unhydrogenated oils of domestic origin are low in saturated fatty acid content. In recent years, the saturated fatty acids in the fat have been characterized as undesirable components, because they lack essential fatty acid activity and promote an increase in the plasma cholesterol levels. The saturated fatty acids in a fatty food may be tolerated provided there is a substantial quantity of essential fatty acids present in that food; in other words, the higher the ratio of essential fatty acids to saturated fatty acids in a food, the better is that food regarded for human consumption. It will be noted from the data in Table I that the ratios of linoleic acid (and accompanying essential fatty acids) to saturated fatty acids, are desirably large for the liquid domestic vegetable oils as compared to the small ratios found in foreign vegetable oils or animal fats.

Margarine, according to Government regulations, is produced by combining a milk phase with not less than 80% by weight of fat. Usually skim milk in the quantity of about 15 to 20% by weight is present; soy milk (a suspension of soy flour in water) may replace in whole or in part the skim milk in the product. Common salt or sodium chloride may or may not be added; but when added to margarine, it is usually employed in an amount of up to 4%. Other optional ingredients include vitamins A and D, coloring, emulsifiers, preservatives and flavoring agents. It will be recognized that margarine composition can be varied considerably for commercial purposes just so long as the final product is solid at room temperature (70° to 80° F.) and possesses the desired organoleptic qualities.

The aqueous milk phase of margarine contributes principally flavor to the product, whereas the fat is responsible for the desired body and functional characteristics. The latter include (a) firmness of the product in the cold to permit the manufacture of the margarine in print form and the slicing of patties, (b) retention of solid characteristics when the print is held at room temperature for an appreciable period of time (good stand-up qualities), and (c) quick melting at elevated temperatures, viz., on hot vegetables, on toast, and in the mouth when the margarine is eaten as such or as a solid along with other foods. Whereas the margarines of the present invention satisfy the Government regulations, heretofore discussed, other margarines falling outside the Government specification can be produced according to the processes described to provide breadspreads of high nutritional value, viz., a margarine containing water in place of the milk phase.

There are a number of tests which those skilled in the art conduct on margarine to determine its suitability as a breadspread. Thus, the fat in margarine will usually melt in the range of about 93° to about 100° F. (Wiley). Margarine containing fat with a melting point below 93° F. will usually fail to retain its form when held at room temperature, while margarine with a melting point above 100° F. will be objectionable in mouthing characteristics, melting slowly and imparting a salvy or waxy organoleptic sensation when eaten. The values for the solids content index of a margarine fat have proved to be of great value in reflecting objectively the body characteristics of the margarine itself. For this test, the dilatometric method as described by Fulton and associates (J.A.O.C.S. 31, 98, 1954) is usually employed and has been used in the course of the present investigations. The less solids a margarine fat contains at 50° F., the more spreadable is the margarine in the cold; but there is a lower limit for this value, since the higher the solids at 50° F., the more easily is the margarine manufactured in print form and readily cut to form patties. The higher the S.C.I. values at 70° and 80° F., the better is the stand-up quality of the margarine (print retains its shape) and the greater is the resistance to oil staining of the cartons in which the margarine is packed. The lower the S.C.I. values at 92° F., the better is the product with respect to mouthing characteristics and ease of flavor release.

In Table II are listed the properties and composition of margarine fats of the prior art. For reference purposes, there are included in the above table values obtained in testing a typical butter fat.

a very good source of linoleic acid, it is also quite high in saturated fatty acid content; the ratio of linoleic to saturated fatty acid content in this margarine is 1.5. However, the product would not be recognized as a mar-

TABLE II

*Properties and composition of margarine fats of the prior art*

| Margarine Fats of the Prior Art | Melting Point, °F. | Solids Content Index at— | | | | Fatty Acid Components, Percent | | Ratio of Linoleic to Saturated |
|---|---|---|---|---|---|---|---|---|
| | | 50° F. | 70° F. | 80° F. | 92° F. | Linoleic | Saturated | |
| A. Former coconut oil type [1] | 94.6 | 38.2 | 12.7 | 6.6 | 2.9 | 2.0 | 75.0 | 0.03 |
| B. Predominantly lard, partly hydrogenated [2] | 104.4 | 33.2 | 22.1 | 14.0 | 7.4 | 5.8 | 61.0 | 0.1 |
| C. Straight hydrogenated domestic oil type (50:50 soybean:cottonseed oil)[3] | 96.0 | 34.9 | 20.0 | 14.5 | 3.7 | 4.9 | 19.4 | 0.3 |
| D. Blends of hydrogenated domestic oils of the present plastic type [4]: | | | | | | | | |
| predominantly soybean oil | 98.8 | 27.3 | 15.9 | 11.6 | 4.7 | 8.9 | 16.3 | 0.6 |
| 50:50 soybean:cottonseed oil | 96.1 | 26.7 | 15.1 | 10.2 | 3.2 | 12.3 | 19.9 | 0.6 |
| 50:50 soybean:cottonseed oil | 94.3 | 24.5 | 13.8 | 8.9 | 2.4 | 13.9 | 19.2 | 0.7 |
| entirely corn oil | 93.9 | 26.5 | 14.4 | 8.9 | 2.3 | 12.9 | 13.7 | 0.9 |
| E. Another predominantly SBO formula as in D+a few percent butter fat | 94.6 | 25.3 | 12.9 | 8.1 | 2.0 | 8.3 | 14.6 | 0.6 |
| F. Blends of completely hydrogenated coconut oil with corn oil: | | | | | | | | |
| 20:80 | 79.7 | 5.8 | 1.2 | 1.0 | 1.0 | 39.8 | 28.0 | 1.4 |
| 50:50 | 96.1 | 25.8 | 6.8 | 3.9 | 2.5 | 24.8 | 52.8 | 0.5 |
| G. Another 20:80 blend as in F+a few percent completely hydrogenated CSO | 99.5 | 10.9 | 6.3 | 4.1 | 2.5 | 41.6 | 28.0 | 1.5 |
| Butter fat for reference purposes | 94.8 | 30.8 | 11.9 | 8.3 | 3.2 | 3.5 | 55.0 | 0.06 |

[1] A blend of 78% coconut oil, 9% beef tallow, 7% lard, and 6% hydrogenated cottonseed oil; this blend simulates the earlier compositions of margarine fats in the year of about 1932.
[2] As presently available in the State of Minnesota.
[3] The component oils, soybean (SBO) and cottonseed (CSO), selectively hydrogenated directly to the constants characteristic of whole margarine fats prior to the introduction of the present plastic margarine fats in about 1952.
[4] One portion of the oil blend selectively hydrogenated to a degree in excess of that characteristic of whole margarine fats, and the other portion to a compensating lesser degree.

Butter is characterized as being a fine product with respect to the ease with which it melts in the mouth, and this is reflected by its melting point and by S.C.I. value of the butter fat at 92° F. Butter is undesirably firm when first removed from the refrigerator, and this is shown by its high S.C.I. value at 50° F. The former coconut oil type of margarine (Type A in Table II) is known to have been exceedingly firm and brittle when removed from the refrigerator, and this is evident by the very high S.C.I. value at 50° F. for the oil in this type of product. The early and even presently produced margarines made predominantly with animal fats (Type B) have been known to be poor products because they melt very slowly in the mouth, and this is reflected by melting point and the S.C.I. value at 92° F. The former margarines (Type C) made with straight hydrogenated domestic oils have been superior to butter, particularly in the stand-up qualities of the product at both 70° and 80° F. which permit these products to be marked in the absence of refrigeration. In recent years, margarines have been modified by blending lightly hydrogenated and highly hydrogenated oils to produce a product with marked improvement in spreadability in the cold but with some sacrifice in mouthing characteristics (first of the products listed under Type D in Table II). By decreasing the ratio of highly hydrogenated fat to lightly hydrogenated fat, it was possible to produce margarines with the eating quality of butter, with equal or better stand-up qualities at room temperatures and with much superior spreadability in the cold (latter margarines under Type D and margarine of Type E). These margarines are for the most part sold as refrigerated products. However, in no case do these products begin to approximate the domestic vegetable oils in nutritional values, concentration of linoleic acid in the margarine fat being in every case well under 15%, with the ratio of linoleic acid to saturated fatty acids being less than 1.0. Butter in this aspect of nutritional value ranks with the poorest of the margarines.

Another product which may be designated as a margarine is Type G in Table II. Whereas this margarine is a very good source of linoleic acid, it is also quite high in saturated fatty acid content; the ratio of linoleic to saturated fatty acid content in this margarine is 1.5. However, the product would not be recognized as a margarine unless it were so labelled. It is exceedingly soft in the cold and at room temperature (as shown by the S.C.I. values), and hence cannot be printed but must be made available to the consumer as a product poured into a rigid container (a tin can). Despite its low S.C.I. value at 92° F., the product is somewhat salvy in the mouth; this is attributed to the shallow slope of the S.C.I. curve which in turn is responsible for the surprisingly high melting point. It is possible by increasing the ratio of completely hydrogenated coconut oil to liquid corn oil in this product to obtain a margarine (second blend of Type F in Table II) which has a desirable degree of firmness in the cold and good eating qualities but poor body at room temperatures. Furthermore, the nutritional value of this modified product is no better than that of conventional margarines, since the ratio of linoleic acid to saturated fatty acids in this product is only 0.5.

From the foregoing, it is apparent that there has never been produced a margarine with the body characteristics duplicating the preferred margarines of today and a fatty acid pattern approximating that of the liquid unhydrogenated domestic vegetable oils.

The object of the present invention is to provide a margarine being rich in essential fatty acids and low in saturated fatty acids and having excellent appearance, eating quality and functional values.

It is another object of this invention to provide a method for preparing a fat to be used in making a highly nutritious margarine.

Other objects and advantages of this invention will become apparent from the following description and explanation.

The margarine of the present invention contains an edible vegetable oil of about 93° to about 100° F. in melting point and containing from about 15 to about 45% linoleic acid and from about 12 to about 27% saturated fatty acids with the ratio of linoleic to saturated fatty acids being in excess of 1.0, and having S.C.I. values of from about 14 to about 28 at 50° F., from about 9 to about 18 at 70° F., from about 6 to about 13 at 80° F., and from about 2 to about 5.5 at 92° F., the said vegetable oil having the fatty acid radicals present in the triglyceride molecules in non-random distribution. Preferably, the edible vegetable oil in this margarine has a melting point of about 94° to about 98° F., contains from about 20 to 40% linoleic acid and from about 13 to about 23% saturated fatty acids with the ratio of linoleic to saturated fatty acids being in excess of 1.2, and has S.C.I. values of from about 18 to about 26 at 50° F., from about 12 to about 17 at 70° F., from about 8 to about 12 at 80° F., and from about 2 to about 4 at 92° F. Here also, the fatty acid radicals are present in non-random distribution.

Since the fat ingredient employed in making the margarines of the present invention is a blend of dissimilar fats, i.e., a limped oil blended with one or more hydrogenated components, the fatty acids in the triglyceride molecules are present in this fat in non-random distribution. The original pattern of even distribution of fatty acid radicals in the original components of the margarine fats of this invention is not disturbed by subjecting one or more of the components to partial hydrogenation.

The process of making the fats to be used in our novel margarines comprises the blending in a ratio of from about 30:70 to about 70:30 parts of a liquid unhydrogenated vegetable oil with a hardened hydrogenated vegetable oil, the liquid oil having a linoleic acid content of from about 25 to about 80%, and the hardened oil having a melting point of from about 98° to about 112° F. and retaining no more than about 5% residual linoleic acid, said hardened oil being further characterized by an absolute increase in saturated fatty acid content of no more than about 16%, and the difference between the S.C.I. values at 50° and 92° F. for this hydrogenated component being from about 30 to about 45 units. The preferred process comprises the blending in a ratio of from about 40:60 to about 60:40 parts of a liquid unhydrogenated vegetable oil with a hardened hydrogenated vegetable oil, the liquid oil having a linoleic acid content of from about 25 to about 80%, and the hardened oil having a melting point of from about 100° to about 110° F. with substantially complete hydrogenation of the linoleic acid originally present but with an absolute increase in saturated fatty acid content of no more than about 14%, and the difference between the S.C.I. values at 50° and 92° F. for this hydrogenated component being from about 33 to about 40 units.

In the present development, invention resides in the discovery that it is possible to prepare margarines having excellent appearance, eating quality and functional values by a technique which may be employed for the preparation of a material having an exceedingly wide plasticity range. Margarine with an exceedingly wide plasticity range is an unacceptable product; it cannot be produced in print form and it is salvy to waxy in the mouth. In making a material of wide plasticity, liquid oil is blended with a hydrogenated fat in order to obtain a product which exhibits a wide plasticity range, one that is very spreadable in the cold and yet retains body and is resistant to oiling off at elevated temperatures. Such products are readily marketed throughout the year, including the summer months, without refrigeration. Whereas such fats are totally unacceptable for use in margarines, they are useful for other purposes. For example, a blend of 75 parts of liquid unhydrogenated cottonseed oil with 25 parts of completely hydrogenated cottonseed oil yields a compound shortening. This shortening fat has a melting point of 127.4° F. and its solids content index from 50° F. through 92° F. is constant at about 26. This compound shortening has softness in the cold, characteristic of the shortening made with all of the fat hydrogenerated to a partial degree under non-selective conditions (the so-called all-hydrogenated shortenings) and, in addition, the compound shortening has superior stand-up qualities at elevated room temperatures since the S.C.I. value at 92° F. for this shortening is almost twice that for the all-hydrogenated shortening. The compound shortening of the type described cannot be used for making a margarine, since it will not melt in the mouth. Margarines made with a fat having an S.C.I. value at 92° F. in excess of 5.5 are objectionably salvy and waxy in the mouth. It is impossible by increasing the ratio of liquid unhydrogenated oil to completely hydrogenated fat to obtain a blend which is satisfactory for use in the manufacture of margarine. Thus, using the same two components mentioned above but in the ratio of 90 to 10 in preparing a softer compound blend yields a fat which is of no value in the manufacture of an acceptable margarine, since this latter blend has a constant solids content index at 50° F. through 92° F. of about 10. An emulsion of this blend with the milk phase provides an emulsion which is impossible to print, and in addition will be unacceptable from the standpoint of melting in the mouth.

Another unsuccessful approach involves blends of liquid unhydrogenated vegetable oils with firm fats of animal origin. Attempts to blend liquid unhydrogenated corn oil with tallow of 110.1° melting point and S.C.I. values of 33.8 at 50° F. and 14.1 at 92° F. (difference in the S.C.I. values of 19.7) fails to provide an acceptable oil blend for use in making the novel margarines of this invention. When the blend is sufficiently firm enough (S.C.I. value of 17.8 at 50° F. for a 40:60 blend) to provide a margarine emulsion which can be printed after chilling, the S.C.. value at 92° F. is about 8 indicating unacceptable mouthing properties for this type of margarine. When the ratio of corn oil to tallow is increased to 50:50 to provide a product with an S.C.I. value of 5.1 at 92° F., the resulting margarine emulsion cannot be printed, since it has an S.C.I. value at 50° F. of less than 14 and this product fails to retain its shape at room temperatures since it has an S.C.I. value at 70° F. which is less than 9. Furthermore, the melting point of this blend is well above the maximal acceptable value of 100° F., being 102.2. Modifications of this liquid oil:animal fat blend involving the addition of tropic fats (the so-called laurin-myristin type fats such as coconut oil) are contrary to the objectives of the present invention. These tropic fats introduce solids at 50° F. into the fat blend for improving the manufacture of margarine in print form but in so doing increase substantially the concentration of saturated fatty acids to such a point that the ratio of linoleic to saturated fatty acid content becomes less than 1.0.

We have discovered that only by using a hardened oil component involving the hydrogenation of domestic vegetable oils under selective conditions to a specific degree as defined within the limits heretofore set forth, is it possible to obtain a fat blend for use in making margarines which are excellent in appearance, eating quality and functional value and possess markedly superior nutritional value to any conventional margarines. In the hydrogenation of the domestic vegetable oils entering into the oil blends of our novel margarines, selective conditions of hydrogenation must be employed. Under such conditions, there occurs hydrogenation of the fatty acids containing active methylene groups (linoleic) in preference to acids devoid of such groups (oleic).

There are several conditions which have a bearing upon whether the hydrogenation shall be non-selective or selective in character, and those skilled in the art are familiar with them. In general, it may be said that the lower the pressure, the higher the temperature, the lesser agitation and the more active the catalyst, the more selective the character of the hydrogenation is likely to be. While each of these factors, as well as others with which those skilled in the art are familiar, plays a part in determining the character of the hydrogenation, the condition which plays the role of primary importance in controlling the type or character of the hydrogenation is temperature. The other conditions, such as pressure, agitation and catalyst activity, are of much lesser importance. We have observed that, generally speaking, a temperature of about 260° F. may be said to be the dividing point between selective and non-selective conditions. More specifically, at hydrogenation temperatures below 250° F., the hydrogenation is likely to be non-selective in character, while at temperatures above 260° F. the hydrogenation is likely to be much more selective. Naturally, the lower the temperature, the more non-selective will be the hydrogenation; while the higher the temperature, the more selective it will be. We contemplate employing hydrogenation temperatures in excess of 260° F. and preferably between 300 and 350° F. in preparing the hydrogenated components used in our oil blends, and the difference between the S.C.I. values at low (50° F.) and at higher temperatures (viz., 92° F.) for a given hydrogenated oil of defined melting point will establish the degree of selectivity obtained. The following is illustrative of the method employed for the present invention.

The liquid starting oil was pumped in a quantity of 20,000 pounds into a hydrogenation vessel. About 0.1% (based on nickel content of the catalyst) of a nickel catalyst known as Rufert's Catalyst (described in U.S. 2,424,811) was added to the oil. The temperature of the mixture was raised to about 280° F. and upon subjecting the reaction mixture to hydrogen gas, at a pressure maintained at about 20 p.s.i. the temperature was increased to about 330° F. Hydrogenation was permitted to continue with agitation of the reaction mixture until the desired melting point and S.C.I. values were obtained. The hydrogenated product was then filtered to remove the catalyst. The resultant hardened fat was then blended with the limpid oil fraction and the blend finally deodorized by high-vacuum steam treatment.

The procedure given above is followed in producing both the hardened and the lightly hydrogenated (to be discussed hereinafter) components of the margarine.

TABLE III

*Examples of the novel margarine [1] of the present invention the fat of which consists of two components*

| Example No. | Fat Component of the Margarine | | | | | | | | | Blend of Liquid to Hardened Oil |
|---|---|---|---|---|---|---|---|---|---|---|
| | Liquid Oil | | | Hardened Oil | | | | | | |
| | Identity | Fatty Acids, Percent | | Identity | M.P., °F. | Solids Content Index at— | | | Fatty Acids, Percent | |
| | | Linoleic | Saturated | | | 50° F. | 92° F. | Difference | Linoleic | Saturated | |
| 1 | Corn | 49.6 | 10.6 | Soybean | 105.3 | 60.9 | 21.7 | 39.2 | 0.0 | 19.4 | 50:50 |
| 2 | do | 49.6 | 10.6 | do | 105.3 | 60.9 | 21.7 | 39.2 | 0.0 | 19.4 | 60:40 |
| 3 | Cottonseed | 50.0 | 22.9 | do | 105.3 | 60.9 | 21.7 | 39.2 | 0.0 | 19.4 | 50:50 |
| 4 | Soybean | [2] 58.8 | 12.5 | do | 105.3 | 60.9 | 21.7 | 39.2 | 0.0 | 19.4 | 50:50 |
| 5 | Corn | 49.6 | 10.6 | Cottonseed | 99.0 | 38.5 | 7.2 | 31.3 | 4.1 | 26.2 | 40:60 |
| 6 | do | 49.6 | 10.6 | do | 101.3 | 43.6 | 9.4 | 34.2 | 1.1 | 27.0 | 45:55 |
| 7 | do | 49.6 | 10.6 | do | 108.3 | 58.3 | 27.1 | 31.2 | 0.0 | 34.8 | 60:40 |
| 8 | Safflower | 76.5 | 10.4 | Safflower | 106.5 | 56.1 | 17.3 | 38.8 | 0.0 | 18.0 | 50:50 |
| 9 | Corn | 49.6 | 10.6 | Corn | 110.7 | 57.6 | 27.1 | 30.5 | 0.0 | 25.5 | 60:40 |
| 10 | do | 49.6 | 10.6 | Soybean | 111.6 | 60.0 | 29.0 | 31.0 | 0.0 | 25.7 | 65:35 |

[1] The aqueous phase comprising about 20% of the overall product, the remainder being the fat.
[2] Including 9% linolenic acid.

In Table III are listed a number of examples of the present invention. The novel margarines contained an aqueous phase of about 20% of the overall product, the remainder being the fat. It will be noted that any of the liquid unhydrogenated domestic vegetable oils may serve on an interchangeable basis as the liquid oil in the fat blend; all of these contain linoleic acid in concentration of from about 25 to about 80% (see Table I). Likewise any of these oils, following hydrogenation to provide a hardened component of the type described in the preceding section of this specification may be used as the solid fat component in the oil blend. The liquid oil and/or the hardened oil may consist of one or more oil or fat types within each category.

Properties and composition of the margarines of the present invention are apparent from the data in Table IV. These products can all be obtained in print form from chilled emulsions (S.C.I. values at 50° F. of not less than

TABLE IV

*Properties and composition of the margarines [1] of the present invention*

| Example No. | Melting Point of Fat, °F. | Solids Content Index of Fat at— | | | | Fatty Acids in Fat, Percent | | |
|---|---|---|---|---|---|---|---|---|
| | | 50° F. | 70° F. | 80° F. | 92° F. | Linoleic | Saturated | Ratio of Linoleic to Saturated |
| 1 | 97.2 | 25.9 | 16.8 | 12.1 | 4.3 | 24.8 | 15.0 | 1.7 |
| 2 | 93.7 | 19.3 | 12.0 | 8.1 | 2.5 | 29.8 | 14.1 | 2.1 |
| 3 | 97.0 | 26.5 | 16.8 | 11.7 | 4.0 | 25.0 | 21.2 | 1.2 |
| 4 | 97.2 | 25.6 | 17.1 | 12.3 | 4.5 | [2] 29.4 | 16.0 | 1.8 |
| 5 | 93.7 | 15.3 | 9.0 | 6.3 | 2.0 | 21.6 | 20.0 | 1.1 |
| 6 | 93.0 | 18.3 | 10.3 | 6.8 | 2.0 | 23.3 | 19.8 | 1.2 |
| 7 | 97.0 | 19.5 | 13.3 | 10.4 | 4.9 | 29.8 | 20.3 | 1.5 |
| 8 | 97.8 | 22.2 | 13.7 | 9.8 | 3.9 | 38.2 | 14.2 | 2.7 |
| 9 | 99.3 | 18.6 | 12.7 | 9.9 | 5.0 | 29.7 | 16.6 | 1.8 |
| 10 | 100.1 | 16.5 | 10.7 | 8.5 | 4.5 | 32.3 | 15.9 | 2.0 |

[1] The aqueous phase comprising about 20% of the overall product, the remainder being the fat.
[2] Including 4.5% linolenic acid.

14), have satisfactory stand-up qualities at room temperature (S.C.I. values at 70° F. of not less than 9), and all melt readily in the mouth (S.C.I. values at 92° F. of less than 5.5). They are rich in linoleic acid (in excess of 15%), low in saturated fatty acid content and have a favorable ratio of linoleic acid to saturated fatty acid content in excess of 1.0. Examples 1, 2, 3, 4 and 8 are markedly superior to conventional margarines such as Types D and E in Table II in nutritional value, having a ratio of linoleic acid to saturated fatty acid content in excess of 1.2 and a linoleic acid content in excess of 20%.

If the hydrogenated oil component is hardened under non-selective conditions but to the same melting point, unsatisfactory margarine fats are produced. Such margarines would then duplicate those prepared from the blends of liquid unhydrogenated vegetable oil and beef tallow as described earlier. If the hardened oil is hydrogenated under selective conditions to a lesser degree than the limits set forth earlier in this specification, then the ratio of liquid to hardened oil must be decreased; this results in products too low in concentration of linoleic acid and too low in the ratio of linoleic acid to saturated fatty acid content. If the hardened oil component has been obtained following hydrogenation under selective conditions to a degree in excess of the limits set forth in this specification, then the ratio of liquid to hardened oil must be increased; this results in products incapable of being printed (S.C.I. values too low at 50° F.) and/or unacceptable in eating quality (S.C.I. values too high at 92° F.). It is only by operating within the limits set forth in this specification, has it been possible to provide our novel margarines.

We have also discovered that it is desirable to introduce a middle fraction in preparing the fat blend for use in making our novel margarines. This middle fraction which may consist of one or more lightly hydrogenated domestic oils is also selectively hydrogenated. This middle fraction is characterized by having a melting point of about 78° to about 93° F. and a difference between the S.C.I. values at 50° F. and 80° F. of from about 8 to about 30 units. This middle fraction is added to the basic oil blend of liquid unhydrogenated vegetable oil and the more highly hydrogenated vegetable oil in a ratio from about 10:90 to about 55:45 parts. Preferably, the middle fraction of lightly hydrogenated oil has a melting point of from about 80 to about 90° F. and a difference between the S.C.I. values at 50° F. and 80° F. is from about 10 to 20 units, and this oil fraction is added to the basic oil blend in a ratio of from about 15:85 to about 30:70 parts.

In Table V are listed a number of examples of novel margarines, the fat of which consists of three components. The properties of the lightly hydrogenated oil component (the middle fraction) are shown in this table as well as the ratio of this middle fraction to the basic oil blend. It will be noted that the preferred lightly hydrogenated oils retain a significant amount of linoleic acid which was originally present in the liquid unhydrogenated oils and that in the hydrogenation of these oils to the degree specified there occurs no increase in the saturated fatty acid content.

TABLE V

*Examples of the novel margarines[1] of the present invention the fat of which consists of three components*

| Example No. | Fat Component of the Margarine | | | | | | | | Ratio of LHO to Basic Blend |
|---|---|---|---|---|---|---|---|---|---|
| | Basic Oil Blend | Lightly Hydrogenated Oil (LHO) | | | | | | | |
| | | Identity | M.P., °F. | Solids Content Index at— | | | Fatty Acids, Percent | | |
| | | | | 50° F. | 80° F. | Difference | Linoleic | Saturated | |
| 11 | Example 1 | Cottonseed | 86.0 | 15.9 | 3.9 | 12.0 | 20.2 | 22.1 | 20:80 |
| 12 | ...do... | Soybean | 80.4 | 16.4 | 1.2 | 15.2 | [2] 15.1 | 10.0 | 20:80 |
| 13 | Example 3 | Cottonseed | 86.0 | 15.9 | 3.9 | 12.0 | 20.2 | 22.1 | 20:80 |
| 14 | Example 4 | Soybean | 80.4 | 16.4 | 1.2 | 15.2 | [2] 15.1 | 10.0 | 20:80 |
| 15 | Example 8 | Safflower | 85.5 | 18.3 | 2.0 | 16.3 | 15.3 | 7.3 | 20:80 |
| 16 | Example 9 | Corn | 83.3 | 12.5 | 1.5 | 11.0 | 14.8 | 9.9 | 20:80 |
| 17 | Example 7 | Soybean | 91.8 | 38.6 | 11.5 | 27.1 | 2.0 | 14.1 | 35:65 |
| 18 | Example 10 | ...do... | 91.8 | 38.6 | 11.5 | 27.1 | 2.0 | 14.1 | 50:50 |

[1] The aqueous phase comprising about 20% of the overall product, the remainder being the fat.
[2] Including 1.5% linolenic acid.

The properties and composition of the margarines of the present invention based upon the three-component fat blends are shown in Table VI.

TABLE VI

*Properties and composition of the margarines[1] of the present invention*

| Example No. | Melting Point of Fat, °F. | Solids Content Index of Fat at— | | | | Fatty Acids in Fat, Percent | | Ratio of Linoleic to Saturated |
|---|---|---|---|---|---|---|---|---|
| | | 50° F. | 70° F. | 80° F. | 92° F. | Linoleic | Saturated | |
| 11 | 94.3 | 22.9 | 14.3 | 9.6 | 2.5 | 23.9 | 16.2 | 1.5 |
| 12 | 94.5 | 23.0 | 14.1 | 9.4 | 2.6 | [2] 22.6 | 14.0 | 1.6 |
| 13 | 94.6 | 24.0 | 14.3 | 9.5 | 2.8 | 24.0 | 21.1 | 1.1 |
| 14 | 94.5 | 23.1 | 14.1 | 9.7 | 2.6 | [2] 26.6 | 17.2 | 1.5 |
| 15 | 96.1 | 21.6 | 12.4 | 8.4 | 2.9 | 32.5 | 11.5 | 2.8 |
| 16 | 96.1 | 16.6 | 11.0 | 7.7 | 3.0 | 26.8 | 15.4 | 1.7 |
| 17 | 94.5 | 23.7 | 13.3 | 8.8 | 2.0 | 20.1 | 18.1 | 1.1 |
| 18 | 94.8 | 26.0 | 14.5 | 9.6 | 2.5 | 17.2 | 15.1 | 1.1 |

[1] The aqueous phase comprising about 20% of the overall product, the remainder being the fat.
[2] Including 0.3% and 3.9% linolenic acid, respectively.

Examples 11, 12, 14 and 15 have excellent appearance, eating quality and functional value. In addition, these margarines are excellent in frying and baking performances. These novel margarines are readily obtained in print form, show good stand-up qualities at room temperature, and melt rapidly in the mouth. In addition, they are rich sources of linoleic acid and provide margarines with the ratio of linoleic acid to saturated fatty acid content well in excess of 1.2.

The margarines of the present invention have been made using the conventional Votator assembly (Bailey, A. E., 1951, Industrial Oils and Fats, Interscience Publishers, Inc., New York, 2nd ed., pp. 921–3) involving a chilling A-unit and a quiescent B-unit. The extruded noodles are packed in a conventional screw-drive packaging (Morpac) machine. The new margarines have also been prepared, preferably by passing the superchilled emulsion as a flowable or pumpable gel continuously through a molding zone with part of the titer heat due to fat crystallization being dissipated after the product has already set up in print form. Other procedures without gas incorporation by which our novel margarine can be made are described in Canadian Patent No. 560,273, and which are incorporated herein by reference.

In order to decrease the extent of treatment used to reduce objectionable color intensities, an edible gas may be incorporated into the present margarine products. By dispersing an edible gas into the warm margarine emulsion containing the fat in the melted state just prior to chilling, color improvement is effected. Furthermore, by plasticizing margarine with an edible gas finely dispersed therein, the resultant margarines have a better appearance to the eye. For these two reasons, improvement in color quality and a drier appearance, an edible gas is finely dispersed in concentrations up to 15% by volume in the product just prior to chilling. Air and preferably an inert gas, such as nitrogen or carbon dioxide, are used for this purpose. The quantity of gas to be included in the present margarines may be greater than 15%; for example, the gas concentration may range from about 15 to 40%, based on the total volume of the whipped margarine. The type of gas and the method by which the margarine is whipped can follow the procedure given in Canadian Patent No. 560,273, and the disclosure in that patent is hereby incorporated by reference.

Having thus provided a written description of the present invention and provided specific examples thereof, it should be understood that no undue restrictions or limitations are to be imposed by reason thereof but that the present invention is defined by the appended claims.

We claim:

1. A margarine the total oil phase of which consists essentially of an edible vegetable oil having a melting point of about 93° to about 100° F., about 15 to about 45% linoleic acid, about 12 to about 27% saturated fatty acids, the ratio of linoleic to saturated fatty acids being in excess of 1.0, S.C.I. values of about 14 to about 28 at 50° F., about 9 to about 18 at 70° F., about 6 to about 13 at 80° F., and about 2 to about 5.5 at 92° F., and said vegetable oil having the fatty acid radicals present in non-random distribution.

2. A margarine the total oil phase of which consists essentially of an edible vegetable oil having a melting point of about 94° to about 98° F., about 20 to about 40% linoleic acid, about 13 to about 23% saturated fatty acids, the ratio of linoleic to saturated fatty acids being in excess of 1.2, S.C.I. values of about 18 to about 26 at 50° F., about 12 to about 17 at 70° F., about 8 to about 12 at 80° F., and about 2 to about 4 at 92° F., and said vegetable oil having the fatty acid radicals present in non-random distribution.

3. The process of making an edible vegetable oil which comprises blending a liquid unhydrogenated vegetable oil with a hardened selectively hydrogenated vegetable oil in a ratio of about 30:70 to about 70:30 parts, the liquid oil having a linoleic acid content of about 25 to about 80%, the hardened oil having a melting point of from about 98° to about 112° F. and containing not more than about 5% linoleic acid, said hardened oil being hydrogenated such that the increase in saturated fatty acid content is not more than about 16%, and the difference between the S.C.I. values at 50° and 92° F. for the hydrogenated component being about 30 to about 45 units.

4. The process of making an edible vegetable oil which comprises blending a liquid unhydrogenated vegetable oil with a hardened selectively hydrogenated vegetable oil in a ratio of from about 30:70 to about 70:30 parts, the liquid oil having a linoleic acid content of about 25 to about 80%, the hardened oil having a melting point of from about 98° to about 112° F. and containing not more than about 5% linoleic acid and said hardened oil being hydrogenated such that the increase in saturated fatty acid content is not more than about 16%, and the difference between the S.C.I. values at 50° and 92° F. for the said hydrogenated component being from about 30 to about 45 units, the resulting total oil phase of the margarine having a melting point of from about 93° to about 100° F., S.C.I. values of about 14 to about 28 at 50° F., about 9 to about 18 at 70° F., about 6 to about 13 at 80° F. and about 2 to about 5.5 at 92° F.

5. The process of making an edible vegetable oil which comprises blending a liquid unhydrogenated vegetable oil with a hardened selectively hydrogenated vegetable oil in a ratio of from about 30:70 to about 70:30 parts, the liquid oil having a linoleic acid content of about 25 to about 80%, the hardened oil having a melting point of from about 98° to about 112° F. and containing not more than about 5% linoleic acid and said hardened oil being hydrogenated such that the increase in saturated fatty acid content is not more than about 16%, and the difference between the S.C.I. values at 50° and 92° F. for this said hydrogenated component being about 30 to about 45 units, the resulting total oil phase of the margarine having a melting point of about 93° to about 100° F., S.C.I. values of about 14 to about 28 at 50° F., about 9 to about 18 at 70° F., about 6 to about 13 at 80° F. and about 2 to about 5.5 at 92° F., and said oil blend having a linoleic acid content of about 15 to about 45% and a saturated fatty acid content of about 12 to about 27%.

6. The process of making an edible vegetable oil which comprises blending a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from about 100° to about 110° F. with substantially complete hydrogenation of the linoleic acid originally present and having an increase in the saturated fatty acid content of not more than about 14%, and the difference between the S.C.I. values at 50° and 92° F. for the said hydrogenated component being about 33 to about 40 units.

7. The process of making an edible vegetable oil which comprises blending a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from 100° to about 110° F. with substantially complete hydrogenation of the linoleic acid originally present and being hydrogenated such that the increase in saturated fatty acid content is not more than about 14%, and the difference between the S.C.I. values at 50° and 92° F. for the hydrogenated component being about 33 to about 40 units, the resulting total oil phase of the margarine having a melting point of about 94° to about 98° F., and S.C.I. values of about 18 to about 26 at 50° F., about 12 to about 17 at 70° F., about 8 to about 12 at 80° F., and about 2 to about 4 at 92° F.

8. The process of making an edible vegetable oil which comprises blending a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from about 100° to about 110° F. with substantially complete hydrogenation of the linoleic acid originally present and such that the increase in saturated fatty acid content is not more than about 14%, and the difference between the S.C.I. values at 50° and 92° F. for the hydrogenated component being from about 33 to about 40 units, the resulting total oil phase of the margarine having a melting point of about 94° to about 98° F., S.C.I. values of about 18 to about 26 at 50° F., about 12 to about 17 at 70° F., about 8 to about 12 at 80° F. and about 2 to about 4 at 92° F., a linoleic acid content of about 20 to about 40% and a saturated fatty acid content of about 13 to about 23%.

9. A margarine, the total oil phase of which consists essentially of an edible vegetable oil which is a blend of a liquid unhydrogenated vegetable oil with a hardened selectively hydrogenated vegetable oil in a ratio of about 30:70 to about 70:30 parts, the liquid oil having a linoleic acid content of about 25 to about 80%, the hardened oil having a melting point of from about 98° to about 112° F. and containing not more than about 5% linoleic acid, said hardened oil being hydrogenated such that the increase in saturated fatty acid content is not more than about 16%, and the difference between the S.C.I. values at 50° and 92° F. for the hydrogenated component being about 30 to about 45 units.

10. A margarine, the total oil phase of which consists essentially of an edible vegetable oil, which is a blend of a liquid unhydrogenated vegetable oil with a hardened selectively hydrogenated vegetable oil in a ratio of from about 30:70 to about 70:30 parts, the liquid oil having a linoleic acid content of about 25 to about 80%, the hardened oil having a melting point of from about 98° to about 112° F. and containing not more than about 5% linoleic acid and said hardened oil being hydrogenated such that the increase in saturated fatty acid content is not more than about 16%, and the difference between the S.C.I. values at 50° and 92° F. for the said hydrogenated component being from about 30 to about 45 units, the resulting blend having a melting point of from about 93° to about 100° F., S.C.I. values of about 14 to about 28 at 50° F., about 9 to about 18 at 70° F., about 6 to about 13 at 80° F. and about 2 to about 5.5 at 92° F.

11. A margarine including an edible vegetable oil comprising a blend of a liquid unhydrogenated vegetable oil with a hardened selectively hydrogenated vegetable oil in a ratio of from about 30:70 to about 70:30 parts, the liquid oil having a linoleic acid content of about 25 to about 80%, the hardened oil having a melting point of from about 98° to about 112° F. and containing not more than about 5% linoleic acid and said hardened oil being hydrogenated such that the increase in saturated fatty acid content is not more than about 16%, and the difference between the S.C.I. values at 50° and 92° F. for this said hydrogenated component being about 30 to about 45 units, the resulting total oil phase of the margarine having a melting point of about 93° to about 100° F., S.C.I. values of about 14 to about 28 at 50° F., about 9 to about 18 at 70° F., about 6 to about 13 at 80° F. and about 2 to about 5.5 at 92° F., and said oil blend having a linoleic acid content of about 15 to about 45% and a saturated fatty acid content of about 12 to about 27%.

12. A margarine, the total oil phase of which consists essentially of an edible vegetable oil which is a blend of a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from about 100° to about 110° F. with substantially complete hydrogenation of the linoleic acid originally present and having an increase in the saturated fatty acid content of not more than about 14%, and the difference between the S.C.I. values at 50° and 92° F. for the said hydrogenated component being about 33 to about 40 units.

13. A margarine including an edible vegetable oil comprising a blend of a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from 100° to about 110° F. with substantially complete hydrogenation of the linoleic acid originally present and being hydrogenated such that the increase in saturated fatty acid content is not more than about 14%, and the difference between the S.C.I. values at 50° and 92° F. for the hydrogenated component being about 33 to about 40 units, the resulting total oil phase of the margarine having a melting point of about 94° to about 98° F., and S.C.I. values of about 18 to about 26 at 50° F., about 12 to about 17 at 70° F., about 8 to about 12 at 80° F., and about 2 to about 4 at 92° F.

14. A margarine including an edible vegetable oil comprising a blend of a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from about 100° to about 110° F. with substantially complete hydrogenation of the linoleic acid originally present and such that the increase in saturated fatty acid content is not more than about 14%, and the difference between the S.C.I. values at 50° and 92° F. for the hydrogenated component being from about 33 to about 40 units, the resulting total oil phase of the margarine having a melting point of about 94° to about 98° F., S.C.I. values of about 18 to about 26 at 50° F., about 12 to about 17 at 70° F., about 8 to about 12 at 80° F. and about 2 to about 4 at 92° F., a linoleic acid content of about 20 to about 40%, and a saturated fatty acid content of about 13 to about 23%.

15. The process of making an edible vegetable oil, said process consisting essentially of blending a liquid unhydrogenated vegetable oil with a hardened selectively hydrogenated vegetable oil in a ratio of about 30:70 to about 70:30 parts, the liquid oil having a linoleic acid content of about 25 to about 80%, the hardened oil having a melting point of from about 98° to about 112° F. and containing not more than about 5% linoleic acid, said hardened oil being hydrogenated such that the increase in saturated fatty acid content is not more than about 16%, and the difference between the S.C.I. values at 50° and 92° F. for the hydrogenated component being about 30 to about 45 units and adding to said blend a lightly hydrogenated oil in a ratio of about 10:90 to about 45:55 parts to provide the margarine fat of claim 1, said lightly hydrogenated oil having a melting point of about 78° to about 93° F. and a difference between the S.C.I. values at 50° F. and 80° F. of about 8 to about 30 units.

16. The process of making an edible vegetable oil, said process consisting essentially of blending a liquid unhydrogenated vegetable oil with a hardened selectively hydrogenated vegetable oil in a ratio of from about 40:60 to about 60:40 parts, the liquid oil having a linoleic acid content of about 25 to about 80%, the hardened oil having a melting point of from about 100° to about 110° F. with substantially complete hydrogenation of the linoleic acid originally present and having an increase in the saturated fatty acid content of not more than about 14%, the difference between the S.C.I. values at 50° and 92° F. for the said hydrogenated component being about 33 to about 40 units and adding to said blend a lightly hydrogenated oil in a ratio of about 15:85 to about 30:70 parts to provide the margarine fat of claim 2, said lightly hydrogenated oil having a melting point of about 80° to about 90° F. and a difference between the S.C.I. values at 50° F. and 80° F. of about 10 to about 20 units.

References Cited in the file of this patent

UNITED STATES PATENTS

| | | |
|---|---|---|
| 2,814,633 | Gooding | Nov. 26, 1957 |
| 2,890,959 | Phillips | June 16, 1959 |

OTHER REFERENCES

Bailey: Industrial Oil and Fat Products, 2nd Edition, 1951, page 760.